United States Patent
Dietz

(10) Patent No.: US 8,712,838 B2
(45) Date of Patent: Apr. 29, 2014

(54) DYNAMIC WEB PAGE CONSTRUCTION BASED ON DETERMINATION OF CLIENT DEVICE LOCATION

(75) Inventor: Timothy A. Dietz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/695,448

(22) Filed: Jan. 28, 2010

(65) Prior Publication Data

US 2010/0121718 A1    May 13, 2010

Related U.S. Application Data

(63) Continuation of application No. 10/715,062, filed on Nov. 17, 2003, now abandoned, which is a continuation of application No. 09/409,596, filed on Sep. 30, 1999, now abandoned.

(51) Int. Cl.
*G06Q 30/00* (2012.01)
*H04W 4/00* (2009.01)

(52) U.S. Cl.
CPC ....................................... *H04W 4/00* (2013.01)
USPC ....................................................... 705/14.1

(58) Field of Classification Search
CPC ....................................................... H04W 4/00
USPC ....................................................... 705/14.1
See application file for complete search history.

(56) References Cited

U.S. PATENT DOCUMENTS

| | | | |
|---|---|---|---|
| 5,099,426 A | 3/1992 | Carigren et al. | |
| 5,623,652 A | 4/1997 | Vora et al. | |
| 5,627,549 A | 5/1997 | Park | |
| 5,664,948 A | 9/1997 | Dimitriadis et al. | |
| 5,682,525 A | 10/1997 | Bouve et al. | |
| 5,704,060 A | 12/1997 | Del Monte | |
| 5,715,443 A | 2/1998 | Yanagihara et al. | |
| 5,724,660 A | 3/1998 | Kauser et al. | |
| 5,732,074 A | 3/1998 | Spaur et al. | |
| 5,737,733 A | 4/1998 | Eller | |
| 5,742,816 A | 4/1998 | Barr et al. | |
| 5,754,776 A | 5/1998 | Hales, II et al. | |
| 5,802,492 A | 9/1998 | DeLorme et al. | |
| 5,806,018 A | 9/1998 | Smith et al. | |
| 5,812,999 A | 9/1998 | Tateno | |
| 5,826,261 A | 10/1998 | Spencer | |
| 5,839,088 A | 11/1998 | Hancock et al. | |
| 5,847,679 A | 12/1998 | Yee et al. | |

(Continued)

*Primary Examiner* — Daniel Lastra

(74) *Attorney, Agent, or Firm* — Yee & Associates, P.C.; Jeffrey S. LaBaw

(57) ABSTRACT

A method for serving a web page begins by storing a set of location-specific page elements. In response to a request for the web page from a client browser, a control routine parses the request to locate a geographic location data string identifying a location of the client browser that has made the request. The geographic location data string may be generated at the client browser in a number of different ways, e.g., by a Global Positioning System (GPS) receiver coupled to the client computer. At the server, the web page is built dynamically using the geographic location data string to select a given one of the set of location-specific page elements and, preferably, an element having content associated with a physical location in proximity to the location of the client browser. The web page is then served in response to the request. In this way, targeted advertising or other page content is included in the web page as a function of the client browser location.

21 Claims, 3 Drawing Sheets

(56) References Cited

U.S. PATENT DOCUMENTS

| | | |
|---|---|---|
| 5,848,373 A | 12/1998 | DeLorme et al. |
| 5,854,597 A | 12/1998 | Murashita et al. |
| 5,861,841 A | 1/1999 | Gildea et al. |
| 5,873,076 A | 2/1999 | Barr et al. |
| 5,938,721 A | 8/1999 | Dussell et al. |
| 6,091,596 A | 7/2000 | Hollenberg |
| 6,133,853 A | 10/2000 | Obradovich et al. |
| 6,138,142 A | 10/2000 | Linsk |
| 6,240,360 B1 | 5/2001 | Phelan |
| 6,252,544 B1 | 6/2001 | Hoffberg |
| 6,286,045 B1 | 9/2001 | Griffiths et al. |
| 6,301,590 B1 | 10/2001 | Siow et al. |
| 6,321,158 B1 | 11/2001 | DeLorme et al. |
| 6,408,360 B1 | 6/2002 | Chamberlain et al. |
| 6,414,602 B2 | 7/2002 | Polyakov |
| 6,522,875 B1 * | 2/2003 | Dowling et al. ........... 455/414.3 |
| 6,584,548 B1 | 6/2003 | Bourne et al. |

* cited by examiner

DYNAMIC WEB PAGE CONSTRUCTION BASED ON DETERMINATION OF CLIENT DEVICE LOCATION

This application is a continuation of application Ser. No. 10/715,062, filed Nov. 17, 2003, which was a continuation of application Ser. No. 09/409,596, filed Sep. 30, 1999, status abandoned.

BACKGROUND OF THE INVENTION

1. Technical Field

This invention relates generally to information retrieval in a computer network. More particularly, the invention relates to a method and computer program product for dynamically serving a given web-page element (e.g., an advertisement) based on a location of the requesting client device.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a Web server is sometimes referred to as a Web site.

In the past, client machines were typically desktop or laptop computers. Recently, the computer industry has sought to add computer processing and communications capabilities to devices other than what would normally be considered a traditional computer. Such devices are quite varied and include, for example, personal digital assistants (PDAs), business organizers (e.g., IBM® WorkPad®, the 3Com® PalmPilot®, and the like), smartphones, cellular phones, desktop screen phones, in-vehicle devices, other handheld devices, and the like. For convenience, these devices, as a class, are sometimes referred to as "pervasive computing" clients as they are devices that are designed to be connected to servers in a computer network and used for computing purposes regardless of their location.

With client devices becoming more portable, there have also been attempts to customize web content to a particular user's location. One such technique is described in IBM Technical Disclosure Bulletin, Vol. 41 No. 1, January 1998, titled "Method for Using Global Position System to Find Close Services." In this disclosure, a laptop computer having a Global Position System (GPS) creates a "cookie" with longitude and latitude information. This cookie can be extracted by a search engine when the user enters a search request to allow searches to be performed based on the laptop's location. In particular, the search engine's database contains longitude and latitude information for each business, and the search engine includes a routine that calculates the distance between longitude and latitude pairs. In use, the user navigates to the search engine and fills in a form identifying a type of business (e.g., restaurant, theatre, etc.) to be located and the distance he or she is willing to travel to that business. The user submits this page to the search engine, which extracts the cookie having the laptop position information. For each service found in the database, the distance routine is used to identify those services that are "close" enough to the user's location. These search results are then returned to the user.

While the technique described above is advantageous, it is limited to search engine content. Thus, the user merely receives a list of targeted URLs or links that must then be evaluated. In the web environment, however, there are many different types of page content other than links. To give just one example, most commercial web site pages include advertising in the form of banners or the like. While it is known in the prior art to serve a given banner advertisement as a function of either the user's past browsing activities or keywords entered into a search engine, the targeted serving of such content based on client device location has not been attempted. Advertising would be much more effective if the construction of the page returned to the user by the web server were done with knowledge of the user's location. Benefits to sellers of advertising would include the ability to sell targeted advertising capability to businesses that provide physical services like plumbing, landscaping, medical care and the like, which are of most interest only to potential customers in fairly close proximity to their businesses, even though the site these customers may be browsing might be anywhere on the Internet.

It would be desirable to provide a mechanism that serves dynamic web page content based on the current position of the client device. This invention solves this problem.

BRIEF SUMMARY OF THE INVENTION

Dynamic web page content is generated and served as a function of client device location information. In one embodiment, a location determination mechanism, e.g., a GPS receiver, associated with the requesting client machine passes the machine's location to a web server. The web server then builds dynamic page content based on the device location that is passed with the request. In an illustrative embodiment, the page includes an advertisement that identifies a given business establishment located in proximity to the user's then-current location.

According to a more particular aspect of the present invention, a method for serving a web page begins by storing a set of location-specific page elements. In response to a request for the web page from a client browser, a control routine parses the request to identify a geographic location data string identifying a location of the client browser that has made the request. The geographic location data string may be generated at the client browser in a number of different ways, e.g., by a Global Positioning System (GPS) receiver coupled to the client computer, by a user manually entering his or her location coordinates, or the like. At the server, the web page is built dynamically using the geographic location data string to select a given one of the set of location-specific page elements and, preferably an element having content associated with or identifying a physical location in proximity to the location of the requesting client machine. The web page is then served in response to the request. In this way, targeted advertising or other page content is included in the web page as a function of the client browser location.

The foregoing has outlined some of the more pertinent objects and features of the present invention. These objects should be construed to be merely illustrative of some of the more prominent features and applications of the invention.

Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
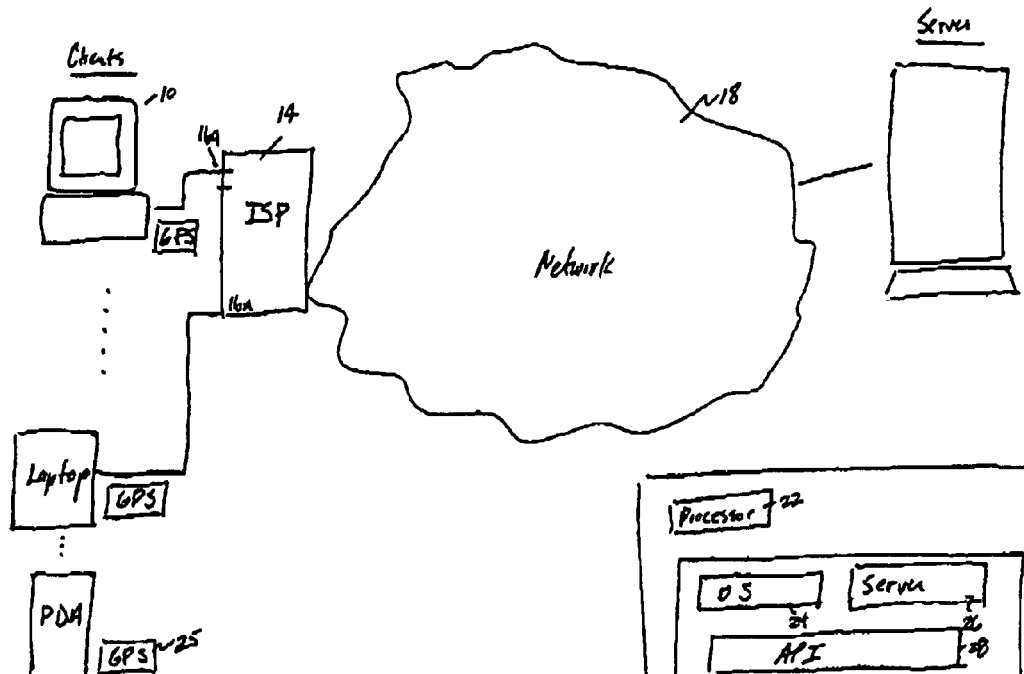
FIG. 1 is a representative system in which the present invention is implemented.
Figure 1:
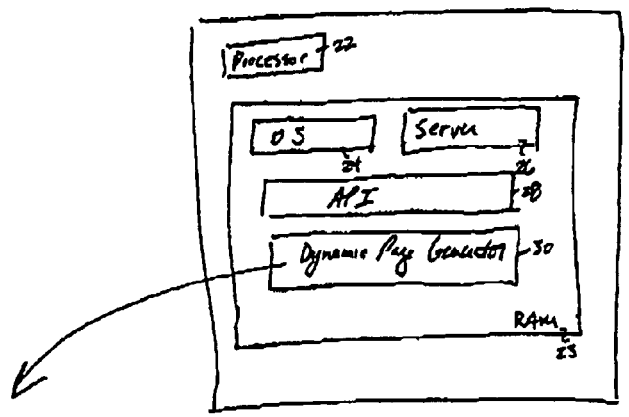

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a-16n. ISP 12 interfaces the client machines 10 to the remainder of the network 18, which includes a plurality of web content server machined 20. Network 18 typically includes other servers (not shown) for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

A representative pervasive client is x86-, PowerPC®- or RISC-based, that includes a realtime operating system such as WindRiver VXWorks™, QSSL QNXNeutrino™, or Microsoft Windows CE, and includes a graphics viewer such as a Web browser. An illustrative pervasive computer client may render documents in a markup language such as the Handheld Markup Language (HDML). As also illustrated in FIG. 1, a given client machine preferably has a location determining mechanism 25 associated therewith. Mechanism 25 is typically a Global Positioning System (GPS) transceiver. The global position system transceiver 25 is a commercially available device. As is well-known, GPS is currently the most precise positioning system generally available to the general public. The GPS comprises a network of satellites orbiting the earth. Each satellite transmits a ranging signal modulated on a 1.575 Ghz carrier. By monitoring the signal from a plurality of satellites, GPS transceiver 25 can determine the client machine's position, i.e. latitude, longitude and altitude, to an accuracy of about 100 meters. Differential GPS, also known in the art and available to the public, is more accurate than standard GPS, but requires an additional land-based transmitter and certain regulatory approvals for its use. Differential GPS may be used in the invention as well.

A representative web server is a computer comprising a RISC-based processor 22, a UNIX-based operating system 24 and a web server program 26 such as IBM Netfinity or WebSphere. os 24 and web server program 26 are supported in system memory 23 (e.g., RAM). The server includes an application programming interface 28 (API) that provides extensions to enable application developers to extend and/or customize the core functionality thereof through software programs including plug-ins, CGI programs, servlets, and the like.

Figure 2:
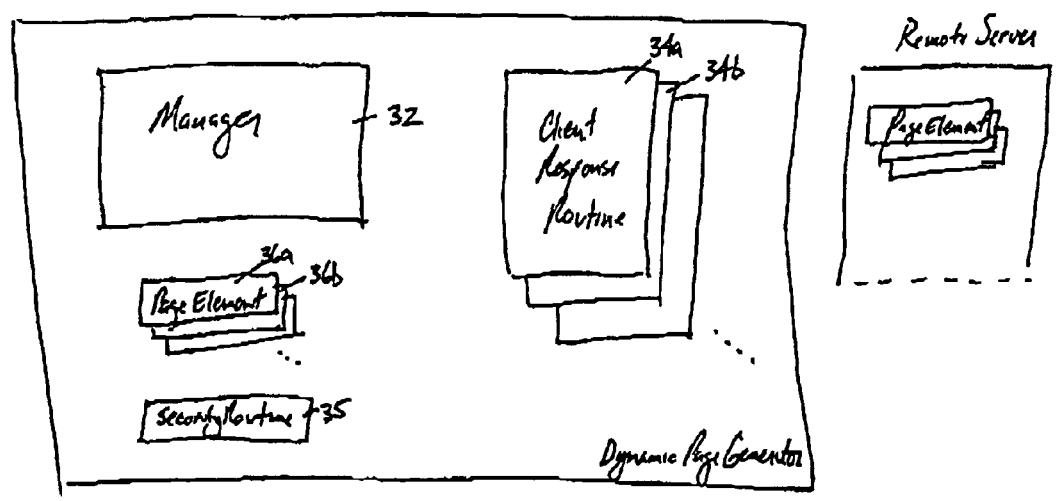
FIG. 2 illustrates the preferred component's of the dynamic page generator of the present invention.

FIG. 2 illustrates one such control program 30 that provides the functionality of the present invention. This program is sometimes referred to herein as a location-specific dynamic page generator as it enables the web server to serve web pages that include given page content elements targeted to the user based on the location of the client machine. Thus, to give a representative example, a given web page may be served together with an advertisement that identifies a specific business in proximity to the location of the client machine that issued the request for the web page.

Typically, location-specific web page elements (e.g., a set of targeted advertisements for a given business) are stored in a given location, e.g., the server on which the control program is executing, or a third party server. Thus, the location-specific page elements may comprise a set of advertisements, each of which has content associated with a particular business located in a given area. To give a simple example, the location-specific page elements may be a set of banner advertisements for a national restaurant chain, with each particular advertisement identifying the location of a particular franchise in a given city. Thus, when a user (in a given city) makes a request for a web page, an advertisement targeted to the user can be pushed to the client machine with the rest of the requested page elements.

According to the present invention, the generator program is supported in system memory of a target server and is executed by a processor. For illustrative purposes, the generator program 30 is implemented as a Java servlet and includes a number of components: a manager 32 for controlling the overall function of the program and for generating one or more instances of a client response routine 34a-n. An instance of the client response routine may be spawned when a client request is received at the server. The client response routine provides the basic functionality of the invention. As will be seen, this routine parses the incoming request to determine the location of the requesting client and to identify a given one of a set of page elements 36a-n that is to be served with the generated page based on the location of the requesting client. In a first embodiment, the page elements 36a-n are stored in the server itself. Alternatively, one or more of the page elements 36 are stored at another server, e.g., an ad server. The generator program 30 may optionally include a security routine 35 for verifying the authenticity of a given client request before serving the dynamic page content.

Figure 3:
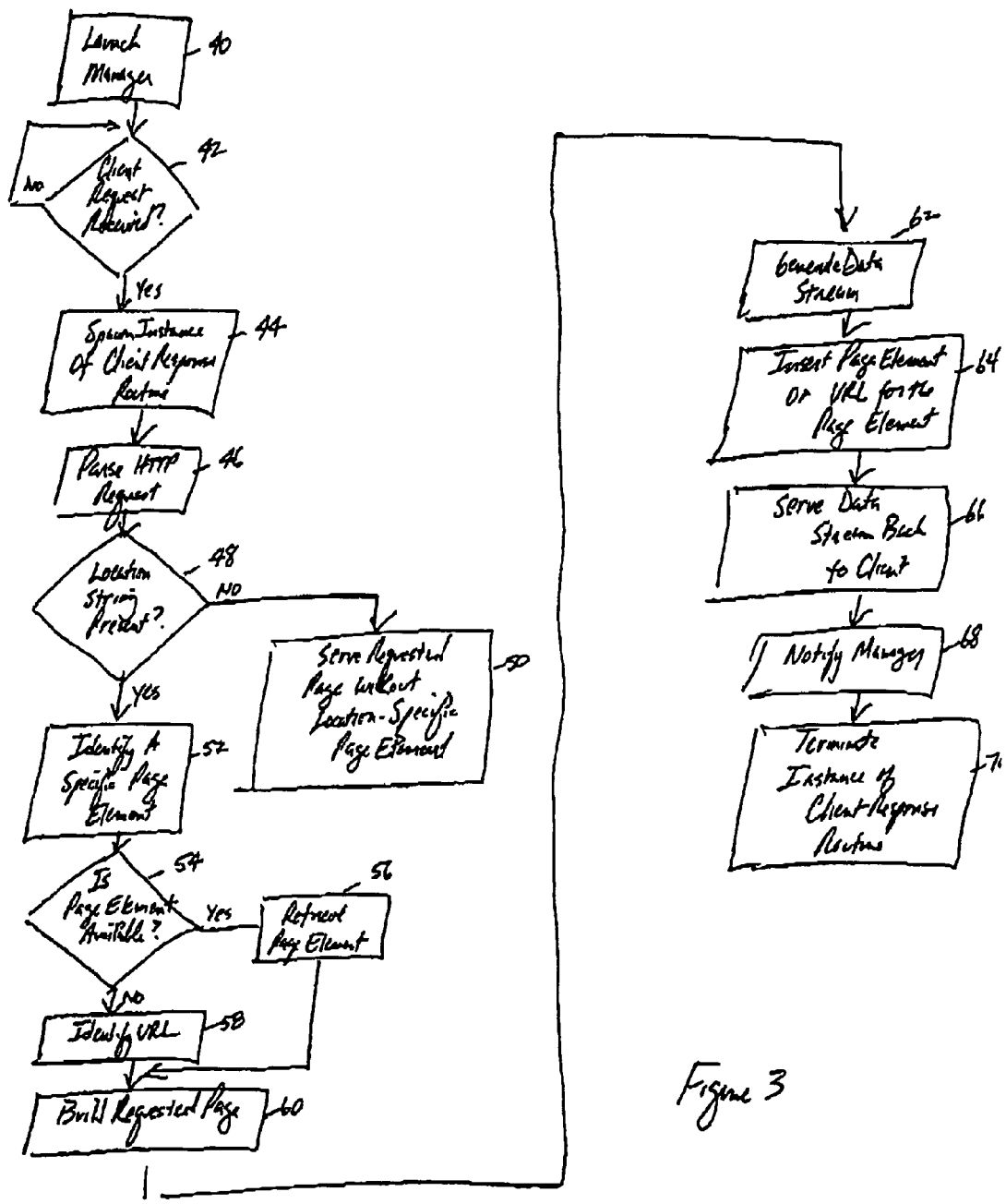
FIG. 3 is a flowchart illustrating a preferred operating routine of the dynamic page generator of the present invention.

The operation of the generator program is illustrated in the flowchart of FIG. 3. It is assumed that a set of page elements has been previously stored either at the server or at another accessible location, e.g., an ad server. The routine begins at step 40 by launching the manager 32. The manager then performs a test at step 42 to determine whether a given client request has been received at the server. If not, the routine cycles. If, however, the outcome of the test at step 42 indicates that a request for a given web page has been received, the manager continues at step 44 and spawns an instance of the client response routine. The client response routine parses the client request at step 46. A test is then performed at step 48 to determine whether the client request includes a geographic location data string identifying the location of the client machine. If the outcome of the test at step 48 is negative, the routine branches to step 50 and provides the requested page without any location-specific page elements. If, however, the outcome of the test at step 48 is positive, which indicates that the client request includes a geographic location data string, the routine continues at step 52. At this step, the client response routine identifies a given one of a set of location-specific page elements that will be used to populate the web page. One of the ways that this is accomplished is by having the routine compare the location of the client with location data associated with each given page element. The location data may be very general (e.g., the name of a given city, town, county, or other identifying feature), or it may be quite specific (e.g., latitude and longitude). In the latter case, the routine typically includes a subroutine or the like to calculate the distance between the client and given locations associated with the set of page elements. In this way, a page element may be more specifically targeted to the client machine's actual location.

At step 54, the client response routine performs a test to determine whether the identified location-specific page element is available at the server. If so, the client response routine retrieves the page element at step 56. If the location-specific page element is unavailable at the server, the client response routine identifies the URL of the page element. This is step 58. At step 60, the client response routine builds the requested page. In particular, at step 60, the client response routine retrieves a flat file comprising the page. At step 62, the routine generates a data stream to be served back to the requesting client. At step 64, the client response routine either inserts the location-specific page element (retrieved at step 56) or the URL (identified at step 58). At step 66, the data stream is served back to the requesting client. At step 68, the client response routine reports back to the manager that it has completed the response. At step 70, the manager terminates the client response routine instance to complete the processing.

There are many alternative ways to build the page having specific page element(s) as a function of the client location. This is step 60 described above. A simple technique is to use dynamically-generated HTML, i.e. database or CGI scripts that generate a web page on the fly. Alternatively, the server may generate the page using more advanced techniques, such as Microsoft's active server page (ASP), Sun Microsystems's Java server Page (JSP), or the Extensible Style Sheet Language (XSL/XSLT) being promoted by the World Wide Web Consortium (W3C). These technologies provide for the generation and serving of dynamic web page content by enabling a page creator to write HTML and then to embed pure programming logic inside the page markup. Microsoft's ASP and Sun's JSP are very similar in that they both are essentially web templates that enable given code (e.g., code written in Java) to be embedded in static HTML to be served in response to a client browser request. In an illustrative JSP implementation, a server (and, in particular, a Java runtime servlet) responds to a client .jsp request as follows: the servlet retrieves a flat file corresponding to the requested page, translates that file into a Java servlet, compiles the servlet, class loads the servlet, and then invokes the servlet to cause given (e.g., customized) web content to be returned to the requesting browser. The XSL/XSLT approach is rooted in formatting and manipulating XML. XSLT, in particular, provides extensible mechanisms for defining templates to manipulate XML of any custom Document Template Definition (DTD). Any of these techniques may be used to build the dynamic page according to the inventive routine.

Thus, according to the present invention, location-specific page element(s) are served with a given web page. The server at which the web page is hosted may be located anywhere on the Internet. Nevertheless, the operator of that server may offer third parties the ability to serve targeted advertisements or other page content as a function of the requesting client's location. One of ordinary skill will appreciate that the types of location-specific page content may be quite varied. Thus, while the present invention has been described in the context of serving location-specific banner advertisements, any given aspect of the page may be client-location specific. Thus, for example, the web page may include community service information, emergency broadcasts, local weather and news information, and the like. Of course, the particular page element content is not a limitation of the present invention.

As noted above, in the preferred embodiment, the client machine includes a GPS transceiver for identifying the location thereof. This is not a limitation of the present invention as other types of location-determining mechanisms may be used. For example, if the client is a handheld or wireless device (such as a PDA), its location may be determined by identifying some physical network device (e.g., such as a tower), which is typically done during the use of such device to communicate with another device or system in the network in which the client is supported. Generalizing, the present invention may be used with any client device that has the capability of passing (to a server) information about its location so that the server can dynamically generated a page and return the page to that client. Of course, the client device need not know its precise location provided it has the capability of passing the location information (preferably in some universal coordinate system such as latitude, longitude, zip code, other predefined information, or the like) to the server.

Figure 4:
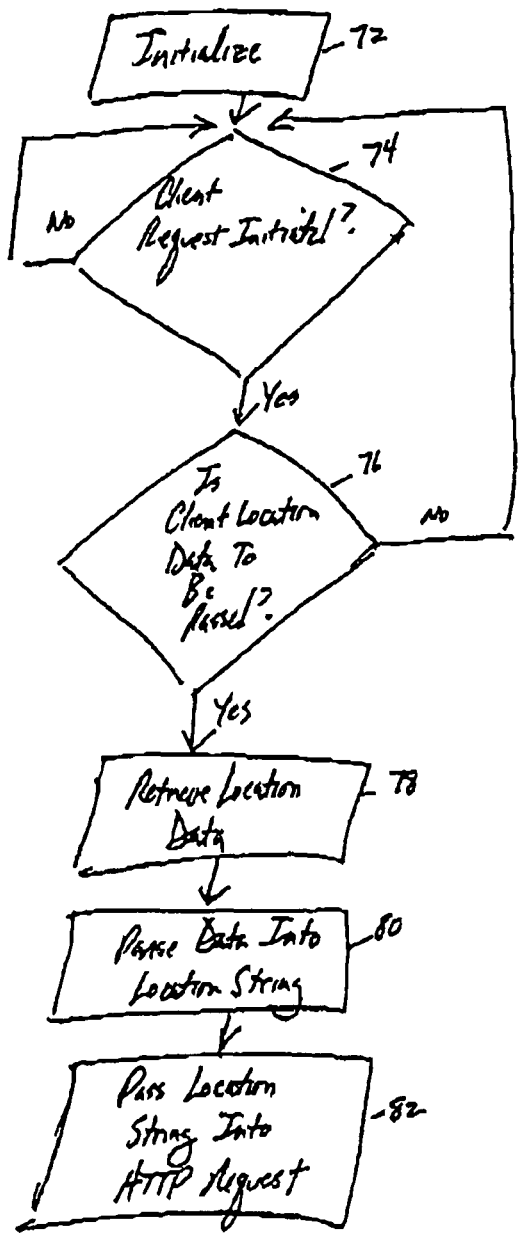
FIG. 4 is a flowchart illustrating a preferred operation of the client location determining routine of the present invention.

In one preferred embodiment, the client machine may include a location determining software routine for identifying the coordinates of the client and processing those coordinates into a form that can be passed to the remote server. FIG. 4 is a flowchart of one embodiment of the location determining software.

The routine begins at step 72 by initializing the routine. At step 74, the routine tests to determine whether a given client request has been initiated. If not, the routine cycles. If the outcome of the test at step 74 is positive, the routine tests at step 76 to determine whether client location data is to be passed with the request. If not, the routine returns back to step 74. If, however, client location data is to be passed with the request, the routine continues at step 78. At this step, the routine retrieves location coordinate data. For example, if the client machine has an associated GPS transceiver, the routine accesses the GPS receiver software and retrieves the current location data. If the client machine does not include a GPS, the routine must obtain the data in some other way. As one example, the routine may prompt the user to enter location data via a pop-up dialog. Alternatively, the routine may access and retrieve pre-stored data about the user's current location. Yet another alternative is for the routine to access a cookie in the browser cookie file that has been set with given machine location-specific profile data. Of course, these examples are merely representative.

At step 80, the routine parses the coordinate data into a geographic location data string. At step 82, this string is passed into the HTTP request to the target server. This completes the client-side processing.

Thus, according to the present invention, the client machine's location coordinates may be provided to the remote server via a variety of techniques, such as client-side modification of cookies in the browser's cookie file prior to browser invocation, access to these coordinates from an authorized Java applet of ActiveX component, passing of the coordinates via an HTML form that is constructed on the client with the coordinates as form variables, or through the actions of a browser plug-in specified as part of the location determining mechanism software.

Thus, the client-side location determining routine may be implemented in any convenient fashion on the machine, e.g., a browser plug-in, a Java applet, a Javascript, an ActiveX control, code implemented within the browser itself, or by a standalone program.

Users of client devices, especially mobile devices, would be well-served by the present invention. For example, a person may use his or her laptop or PDA in a given city or town and receive information or advertisements specific to that location. Moreover, the present invention provides a web site operator with an opportunity for increased revenue from advertising that can be achieved even though the hosting site is far removed from the locale. Indeed, web site operators anywhere could offer any other business the opportunity to have their advertisements pinpointed for accurate delivery in terms of the location of the users who would receive the ads.

As noted above, the inventive page generator mechanism is preferably implemented in or as an adjunct to a target web server. Although not meant to be limiting, the above-described functionality is preferably implemented as a Java servlet or as standalone native code. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

One of ordinary skill will appreciate that the present invention may be varied to provide additional functionality without modifying the basic operation described above. Thus, for example, the server may include control logic that stores a given dynamically-generated page (generated in response to a first request) in a page cache. As additional client requests are received at the server (e.g., from other users), the control logic may examine these requests to determine whether they originate from a location reasonably proximate (e.g., within a given 1 mile radius) from the first request. If so, the server control logic may merely escape out (of the above-defined routine) and serve the previously-cached page rather than having to re-generate it.

As another alternative, if the server control logic determines that a particular user has issued multiple client requests from a same or similar location, the logic may "recognize" this history and serve a different advertisement (or other given content) in the dynamically-generated page.

Having thus described our invention, what we claim as new and desire to secure by Letters Patent is set forth in the following claims.

The invention claimed is:

1. A method for generating and serving a customized web page by a server data processing system, comprising the steps performed by the server data processing system of:
    storing a set of location-specific page elements;
    receiving a user-initiated request for a specific web page from a first client browser, the request including (i) a geographic location data string identifying a first location of the first client browser and (ii) an identifier for the specific web page;
    responsive to the request being received, generating the customized web page using (i) the geographic location data string to select a given one of the set of location-specific page elements having content associated with a physical location in proximity to the first location of the first client browser and (ii) the specific web page, wherein elements from both the specific web page and the given one of the set of location-specific page elements are included in the customized web page;
    serving the customized web page in response to the request;
    receiving a subsequent request for the web page from either the first client browser or a second client browser different from the first client browser;
    determining if the subsequent request originates from a second location that is proximate to the first location of the first client browser; and
    providing a cached version of the customized web page if the second location is proximate to the first location.

2. The method as described in claim 1 wherein the geographic location data string is provided by a Global Positioning System (GPS) device coupled to a client computer in which the first client browser is resident.

3. The method as described in claim 1 wherein the location-specific page elements are a set of web page advertisements.

4. The method as described in claim 3 wherein the given one of the set of location-specific page elements is a web page advertisement for a business located in proximity to the location of the first client browser.

5. The method as described in claim 1 wherein the geographic location data string is provided in a browser cookie.

6. The method as described in claim 1 wherein the geographic location data string is provided in a hypertext markup language (HTML) form.

7. The method as described in claim 1 wherein the set of location-specific page elements are stored at a third party server.

8. The method as described in claim 1 wherein the customized web page is built using a Java server page mechanism.

9. A computer program product stored in a computer-readable storage medium and executable by a data processing system for serving a customized web page, the computer program product comprising instructions for performing steps of:
 receiving, by a server data processing system, a user-initiated request for a specific web page from a first client browser, the request including (i) a geographic location data string identifying a first location of the first client browser and (ii) an identifier for the specific web page;
 generating, by the server data processing system responsive to the request, the customized web page using (i) the geographic location data string to select a given one of a set of location-specific page elements having content including a physical location in proximity to the first location of the first client browser and (ii) the specific web page, wherein elements from both the specific web page and the given one of the set of location-specific page elements are included in the customized web page;
 receiving, by the server data processing system, a subsequent request for the web page from either the first client browser or a second client browser different from the first client browser;
 determining, by the server data processing system, if the subsequent request originates from a second location that is proximate to the first location of the first client browser; and
 providing, by the server data processing system, a cached version of the customized web page if the second location is proximate to the first location.

10. The computer program product as described in claim 9 further including instructions for performing a step of serving the customized web page in response to the request.

11. The computer program product as described in claim 9 wherein the geographic location data string is provided by a Global Positioning System (GPS) device coupled to a client computer in which the first client browser is resident.

12. The computer program product as described in claim 9 wherein the location-specific page elements are a set of web page advertisements.

13. The computer program product as described in claim 9 wherein the given one of the set of location-specific page elements is a web page advertisement for a business located in proximity to the location of the first client browser.

14. The computer program product as described in claim 9 wherein the instructions for performing the step of generating the customized web page is a Java server page mechanism.

15. A web server, comprising:
 a processor and memory;
 first instructions to receive a user-initiated request for a specific web page from a first client browser, the request including (i) a geographic location data string identifying a first location of the first client browser and (ii) an identifier for the specific web page;
 second instructions, responsive to the first instructions, to generate a customized web page using (i) the geographic location data string to select a given one of a set of location-specific page elements having content including a physical location in proximity to the first location of the first client browser and (ii) the specific web page, wherein elements from both the specific web page and the given one of the set of location-specific page elements are included in the customized web page;
 third instructions to receive a subsequent request for the web page from either the first client browser or a second client browser different from the first client browser;
 fourth instructions to determine if the subsequent request originates from a second location that is proximate to the first location of the first client browser; and
 fifth instructions to provide a cached version of the customized web page if the second location is proximate to the first location.

16. The web server as described in claim 15 further including fifth instructions to serve the customized web page in response to the request.

17. The web server as described in claim 15 wherein the geographic location data string is provided by a Global Positioning System (GPS) device coupled to a client computer in which the first client browser is resident.

18. The web server as described in claim 15 wherein the location-specific page elements are a set of web page advertisements.

19. The web server as described in claim 18 wherein the given one of the set of location-specific page elements is a web page advertisement for a business located in proximity to the location of the first client browser.

20. The web server as described in claim 15 wherein the second instructions to generate the customized web page is a Java server page mechanism.

21. A method for generating and serving a customized web page by a server data processing system, comprising steps implemented by the server data processing system of:
 receiving a user-initiated first request for a specific web page from a client browser, the first request being associated with a geographic location data string identifying a location of the client browser;
 responsive to the first request being received, dynamically generating the customized web page using (i) the geographic location data string to select a given location-specific page element and (ii) the specific web page, wherein elements from both the specific web page and the given one of the set of location-specific page elements are included in the customized web page;
 caching the customized web page for future use;
 serving the customized web page in response to the first request;
 responsive to receipt of a second request for the web page, determining whether the second request originates within a given distance from the location; and
 if so, retrieving and serving the cached customized web page in response to the second request.

* * * * *